US010152169B2

(12) United States Patent
Smith et al.

(10) Patent No.: US 10,152,169 B2
(45) Date of Patent: Dec. 11, 2018

(54) PROTECTIVE CASE WITH COVER FOR WEARABLE ELECTRONIC DEVICE

(71) Applicant: OTTER PRODUCTS, LLC, Fort Collins, CO (US)

(72) Inventors: W. Travis Smith, Fort Collins, CO (US); Carlton R. Lay, Auburn, AL (US)

(73) Assignee: Otter Products, LLC, Fort Collins, CO (US)

( * ) Notice: Subject to any disclaimer, the term of this patent is extended or adjusted under 35 U.S.C. 154(b) by 96 days.

(21) Appl. No.: 15/172,966

(22) Filed: Jun. 3, 2016

(65) Prior Publication Data

US 2016/0357324 A1 Dec. 8, 2016

Related U.S. Application Data

(60) Provisional application No. 62/171,970, filed on Jun. 5, 2015.

(51) Int. Cl.
| | | |
|---|---|---|
| *G06F 3/041* | (2006.01) | |
| *A45C 11/00* | (2006.01) | |
| *A45F 5/00* | (2006.01) | |
| *G06F 1/16* | (2006.01) | |

(52) U.S. Cl.
CPC ............ *G06F 3/0416* (2013.01); *A45C 11/00* (2013.01); *A45F 5/00* (2013.01); *G06F 1/163* (2013.01); *A45C 2011/002* (2013.01); *A45F 2005/008* (2013.01); *A45F 2200/0516* (2013.01)

(58) Field of Classification Search
CPC ......... A45F 2003/003; A45F 2005/002; A45C 5/14; A45C 5/141; A45C 5/143; A45C 5/145

USPC .................................................. 224/576, 152
See application file for complete search history.

(56) References Cited

U.S. PATENT DOCUMENTS

| | | | |
|---|---|---|---|
| 4,627,738 A | 12/1986 | Kao | |
| 4,847,818 A | 7/1989 | Olsen | |
| 5,993,019 A * | 11/1999 | Kline | ...................... G09F 13/04 |
| | | | 200/314 |
| 6,212,414 B1 | 4/2001 | Alameh et al. | |
| 6,249,487 B1 | 6/2001 | Yano et al. | |
| 6,528,725 B2 | 3/2003 | Noguchi et al. | |

(Continued)

OTHER PUBLICATIONS

Amy-Mae Elliott, Macworld2008: H2O Audio launches iN3 case for iPod nano, dated Jan. 16, 2008, downloaded from https://www.pocket-lint.com/gadgets/news/85060-h2o-audio-in3-nano-case Jan. 23, 2018, 3 pages.

(Continued)

*Primary Examiner* — Brian D Nash (57) ABSTRACT

A protective case for a wearable electronic device, the wearable electronic device having a touch-sensitive display. The protective case having a shell that encases a portion of the wearable electronic device and a hinged cover attached to the shell. The cover has an open position and a closed position for covering and allowing direct access to the touch-sensitive display. The cover includes one or more flexible buttons configured to be pressed by a user and configured to activate a corresponding area of the encased touch-sensitive display of the encased wearable electronic device when the cover is in a closed position and the wearable electronic device is encased in the shell.

18 Claims, 8 Drawing Sheets

(56) References Cited

U.S. PATENT DOCUMENTS

| | | | |
|---|---|---|---|
| 6,619,835 B2 | 9/2003 | Kita | |
| 6,646,864 B2* | 11/2003 | Richardson | G06F 1/1626 |
| | | | 206/305 |
| 6,661,344 B2 | 12/2003 | Bowling | |
| 7,180,735 B2* | 2/2007 | Thomas | G06F 1/1626 |
| | | | 206/701 |
| 7,263,032 B2* | 8/2007 | Polany | H04R 1/44 |
| | | | 367/131 |
| 7,398,151 B1 | 7/2008 | Burrell et al. | |
| 8,090,130 B2* | 1/2012 | Zorkendorfer | G06F 1/163 |
| | | | 24/3.11 |
| 8,562,489 B2 | 10/2013 | Burton et al. | |
| 8,651,346 B1 | 2/2014 | Williams | |
| 8,792,232 B2* | 7/2014 | Richardson | G06F 1/1626 |
| | | | 361/679.02 |
| D722,603 S * | 2/2015 | Lay | D14/447 |
| 9,287,916 B2* | 3/2016 | Wicks | H04B 1/3888 |
| 2002/0030094 A1 | 3/2002 | Curry et al. | |
| 2002/0154575 A1 | 10/2002 | Fujita et al. | |
| 2003/0116596 A1 | 6/2003 | Terasawa | |
| 2006/0050903 A1* | 3/2006 | Chan | H01R 13/5213 |
| | | | 381/124 |
| 2007/0030154 A1 | 2/2007 | Aiki et al. | |
| 2007/0047722 A1* | 3/2007 | Kunimune | H04M 1/23 |
| | | | 379/368 |
| 2007/0049365 A1* | 3/2007 | Norris | G08B 5/223 |
| | | | 455/575.8 |
| 2007/0279852 A1 | 12/2007 | Daniel et al. | |
| 2008/0017678 A1 | 1/2008 | Anderson et al. | |
| 2008/0024961 A1 | 1/2008 | Anderson et al. | |
| 2008/0080734 A1* | 4/2008 | Forth | H04R 1/021 |
| | | | 381/386 |
| 2008/0238366 A1 | 10/2008 | Kohata | |
| 2009/0196124 A1* | 8/2009 | Mooring | G04B 37/005 |
| | | | 368/204 |
| 2012/0049865 A1 | 3/2012 | Iwasaki et al. | |
| 2014/0180019 A1 | 6/2014 | Martinez et al. | |
| 2014/0221854 A1 | 8/2014 | Wai | |
| 2014/0244009 A1 | 8/2014 | Mestas | |
| 2014/0259264 A1 | 9/2014 | Schermerhorn | |
| 2014/0259265 A1 | 9/2014 | Schermerhorn | |
| 2014/0266939 A1 | 9/2014 | Baringer et al. | |
| 2014/0337621 A1 | 11/2014 | Nakhimov | |
| 2014/0378853 A1 | 12/2014 | McKinney et al. | |
| 2015/0135418 A1 | 5/2015 | Schermerhorn | |
| 2016/0317086 A1 | 11/2016 | Smith et al. | |

OTHER PUBLICATIONS

Apple Support, Identify your iPod model, downloaded from https://support.apple.com/en-us/HT204217 Jan. 23, 2018, 18 pages.

Wikipedia, H2O Audio, downloaded from https://en.wikipedia.org/wiki/H2O_Audio Jan. 23, 2018, 2 pages.

* cited by examiner

PROTECTIVE CASE WITH COVER FOR WEARABLE ELECTRONIC DEVICE

CROSS-REFERENCE TO RELATED APPLICATIONS

This application claims priority to U.S. Provisional Patent Application No. 62/171,970, filed Jun. 5, 2015, which is hereby incorporated by reference in its entirety.

FIELD

This disclosure relates generally to cases, covers, shells, enclosures, and bands for electronic devices. More specifically, the instant application relates to cases, covers, shells, enclosures, and bands for wearable electronic devices.

BACKGROUND

Portable electronic devices are commonly used for communication, entertainment, and/or information purposes. Portable electronic devices include devices such as smartphones, cellular phones, mobile communication devices, computers, portable computing devices, mobile computing devices, tablet computers, cameras, video players, audio players, electronic media readers, two-way radios, global positioning satellite (GPS) devices, and/or other types of electronic computing or communication devices, including combinations thereof. Recent advances in electronics and miniaturization have allowed some or all of the functions of these devices to be implemented in even smaller electronic devices that may be worn on a user's body. Wearable electronic devices may include watches, smartwatches, fitness monitors, activity monitors, biometric monitors, medical monitors, functional jewelry, and interactive implementations thereof.

In some situations, a wearable electronic device may be a standalone device, in the sense that it performs a variety of electronic functions without relying on any other devices. In other situations, a wearable electronic device may operate in conjunction with another electronic device that is carried by or near the user. In one specific example, a smartwatch (e.g. the APPLE®WATCH, PEBBLE®, SAMSUNG® GEAR, etc.) worn by a user provides a number of functions and may communicate with or through a smartphone that is separately carried by the user or is placed somewhere near the user. In this example, the smartwatch makes certain features or functions more readily available to a user without the user having to take the smartphone out of a pocket or bag and/or without having to activate the screen of the smartphone. However, in other situations, the smartwatch may operate as a standalone device without relying on a nearby smartphone. While many of the examples herein are described with respect to a smartwatch, the apparatuses and techniques disclosed herein are also applicable to other types of electronic devices including fitness monitors, activity monitors, biometric monitors, medical monitors, functional jewelry, and the like. While described as a "watch," a smartwatch may provide many functions other than providing the time including, providing indications of received email messages or text messages, providing calendar information, providing appointment information or reminders, receiving inputs from the user, displaying weather information, capturing biometric information, and/or interactive implementations thereof.

As with other types of electronic devices, wearable electronic devices may be subject to damage from shock, vibration, impact, external forces, sharp objects, water, dirt, dust, snow, rain, sweat, chemicals, and/or other damaging elements. For example, wearable electronic devices may be used when exercising, in order to monitor biometric signals, and/or to provide sound to a user. In some situations, wearable electronic devices may be even more susceptible to some of these damaging forces or elements because they are worn on the body and/or because of where they are worn on the body. Damaging forces may cause the wearable electronic device to no longer be operable or may simply damage the physical appearance of the wearable electronic device. In some instances, wearable electronic devices may have bands, chains, and/or other attachment mechanisms that are removable or changeable such that a user may be able to change or add their own band, chain, and/or other attachment mechanism. Improved protection and/or more durable bands for these types of wearable electronic devices are needed.

Along with the need to protect such wearable electronic devices, there remains a need to access and activate a touch-sensitive display of the wearable electronic device while in use. For example, a user may wish to use a touch-sensitive display on the wearable electronic device without looking at it, in order to quickly activate functions such as starting/stopping a stopwatch or timer, starting/stopping recording of a running route, or starting/stopping/adjusting volume of audio coming from a connected portable electronic device (such as a smartphone) or from the wearable electronic device itself. The user may also wish to easily view the display of the device when the user is finished exercising.

Wearable electronic devices can also have a limited battery life, due in large part to the power consumption of the display used. High contrast, color LED displays can reduce battery life if they are turned on often or continuously, requiring charging or battery change more often. It is therefore desirable to further reduce the amount of power consumed by the display of a wearable electronic device by a user, thereby increasing its battery life.

SUMMARY

In one aspect, the disclosure provides a protective encasement that includes a shell and cover for a wearable electronic device having a touch-sensitive display. The protective encasement may include a shell and a cover, and may be integrated with a wearable band or strap, with a bike mount, a shell having a clip, or a shell attached to some other attachment mechanism or element (suction cup, magnet, etc.). The cover may be moveable relative to the shell and may have an opened position and a closed position, the opened position to allow direct access to the touch-sensitive display of the wearable electronic device. The cover may include one or more raised flexible buttons. Each of the one or more raised flexible buttons may be able to activate a corresponding area of the touch-sensitive display of the wearable electronic device when the cover is in the closed position.

In another aspect, the disclosure provides systems that include a software application executable on a computer processor of the wearable electronic device and a flexible cover. The software application may include non-transitory instructions that direct the computer processor to configure at least one region of a touch-sensitive display of the electronic device as at least one user-selectable input. Each of the at least one user-selectable inputs activates an associated function of the software application. The system also includes a flexible cover for protecting the touch-sensitive display. The flexible cover includes one or more flexible buttons that align with a region of the touch-sensitive display such that a force exerted on the at least one flexible button collapses the button, transmits the force to the aligned region of the touch-sensitive display, and activates the corresponding user-selectable input, as well as activating the associated function of the software application.

In another aspect, the disclosure provides a protective encasement for a wearable electronic device having a touch-sensitive display. The protective encasement may include a shell and a low-power display that is attached to the shell. The low-power display may be attached to the shell by a hinge element, allowing the display to move in relation to the wearable electronic device positioned in the shell. The low-power display may be in an opened position to expose the touch-sensitive display of the wearable electronic device, or in a closed position to cover touch-sensitive display. The low-power display may display text and/or images transmitted by the wearable electronic device. The low-power display may display text and/or images stored in the low-power display itself, in response to signals transmitted by the wearable electronic device.

The summary of the technology described above is non-limiting and other features and advantages of the technology will be apparent from the following detailed description of the invention, and from the claims.

BRIEF DESCRIPTION OF THE FIGURES

Embodiments of the present technology are described and explained using the accompanying drawings summarized below.

DETAILED DESCRIPTION OF THE DISCLOSURE

The present disclosure is directed to protective encasements, shells, covers, and low-power displays for wearable electronic devices that include a touch-sensitive display. The wearable electronic device may be quickly and easily inserted into the shell, and the cover or low-power display may be opened and closed over the display of the wearable electronic device.

Figure 1A:
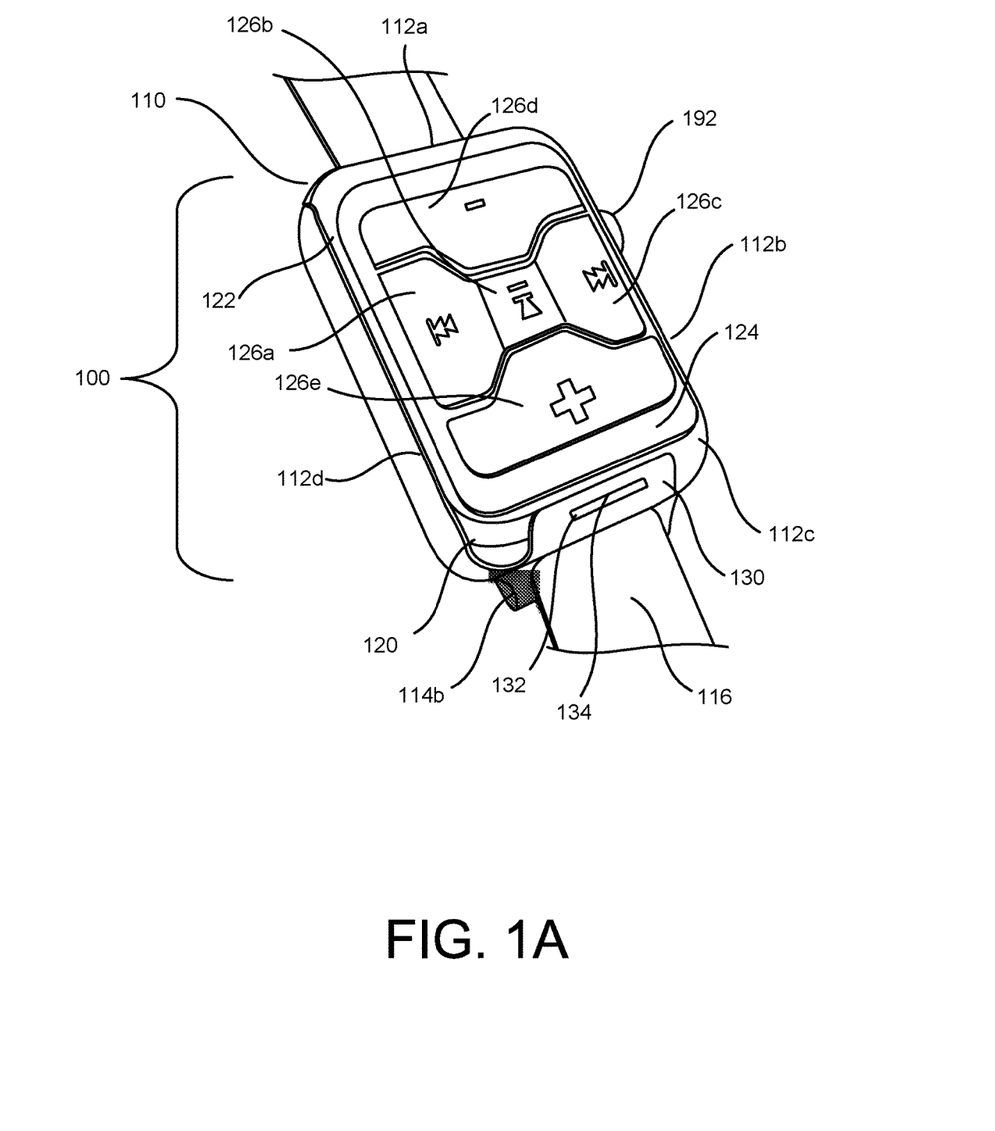
FIG. 1A illustrates a perspective view of a protective encasement embodiment including a shell and an attached cover with flexible buttons that is closed to overlay the touch-sensitive display of a wearable electronic device.

FIG. 1A shows a perspective view of an embodiment of a protective encasement 100 that includes a shell 110 and an attached cover 120 with flexible buttons 126a-e. Protective encasement 100 holds a wearable electronic device 190 (not visible in FIG. 1A) having a display. Shell 110 has sides 112a-d that encase and protect corresponding sides of the wearable electronic device (not visible). The sides 112a-d define a cavity that receives and retains the wearable electronic device. Certain instances of a shell may include apertures that allow user access to buttons, knobs, switches, and other control interfaces of the wearable electronic device. For example, a knob or crown 192 and a button 194 (not visible in FIG. 1A) of the wearable electronic device are visible through corresponding apertures in side 112b of shell 110. In some embodiments, the cavity of shell 110 may include one or more connection elements that interface with corresponding connection elements on the wearable electronic device, to releasably retain the wearable electronic device in the cavity. Shell 110 may be formed from a rigid or semi-rigid material, such as a plastic polymer plastic or metal. Shell 110 may be a single unit, or may be formed from a combination of multiple pieces attached to each other, such as a top member and a bottom member, or first end piece and a second end piece. Multiple pieces of a shell may attach by a friction fit or using internal latching components. In some embodiments, shell pieces may be attached with adhesives. Shell 110 may include a flexible material on its interior or the exterior surface, such as an overmolded or dispensed elastomer, to provide additional protection from being struck or dropped.

Strap or band 116 is attached to the rear surface of shell 110 to allow protective encasement 100 to be worn on a user's body part, such as a wrist, arm, leg, head, or neck. Band 116 may be made of woven or non-woven textile, a polymer (e.g. plastic or neoprene), metal, or other suitable material. In the embodiment depicted in FIG. 1A, strap 116 is threaded through lugs 114a-b (114b not visible). However, strap 116 may be attached to shell 110 by other attachment mechanisms (e.g. hinges), or may be integrally formed with shell 110 (e.g. plastic band). In some embodiments, shell 110 may not include a strap, or may include an attachment mechanism on its rear surface to allow shell 110 to be attached to another object. Exemplary attachment mechanisms include those described in U.S. Ser. No. 14/213,151, and U.S. Pat. No. 8,608,502, each of which is incorporated by reference herein.

FIG. 1A also shows cover 120 overlaying the display of wearable electronic device in shell 110, to protect the display while allowing access to touch functionality of the electronic device display. The display of the wearable electronic device may be able to detect the touch of a user, such as a capacitive touchscreen, a resistive touchscreen, a surface acoustic wave touchscreen, or an optical touchscreen, and may include pressure sensors to allow detection of differences in force applied by a user. Cover 120 includes a perimeter portion 122 that defines a button area 124. The perimeter portion 122 provides protective structure to portions of display-adjacent regions of the wearable electronic device, and allows the cover to be more easily removed. For example, as seen in FIG. 1A, perimeter portion 122 covers a portion of side 112c of shell 110. In some embodiments, the perimeter portion may be rigid or semi-rigid. Button area 124 includes several flexible buttons 126a-e that each permit force to be applied through the flexible button and to a corresponding region of the display. The number of flexible buttons may be larger or smaller than the five buttons depicted, for example, one, two, three, four, five, six, seven, or more buttons may be included. In some embodiments, the button area may be rigid, semi-rigid, or flexible. A rigid or semi-rigid button area may provide additional shock protection to a larger area of the electronic device display, while a flexible button area may be contiguous with the flexible buttons and allow for increased ease of manufacture. In some embodiments, one or more of the flexible buttons 126a-e may be raised or elevated above button area 124, as shown in FIG. 1A. In certain instances, one or more of the flexible buttons 126a-e may be recessed or depressed relative to button area 124. Elevation and/or depression of flexible buttons may provide a tactile frame of reference to a user searching for a specific button by touch alone without looking at the buttons. Tactile detection of the buttons may be beneficial for a user that is exercising, riding a bicycle, operating a vehicle, or undertaking some other activity that may require extended visual attention. Tactile detection may also be beneficial for users with poor eyesight or users utilizing the protective encasement in an environment with reduced visibility.

The wearable electronic device secured and protected by cover 120 may include or make use of a software application to dictate what device functions are activated when a given display region is touched (see below for further details). Flexible buttons 126a-e may include a hollow region that can be collapsed when depressed, such that force may be applied to the display. In some embodiments, flexible buttons 126a-e may include a thickness that rests on the display, such that force is transmitted through the button to the display. Flexible buttons 126a-e also include symbols that are embossed and/or raised from the outer surface of each button, and buttons 126d-e include symbols that are recessed from or depressed relative to the outer surface of the button. The raised and/or recessed symbols allow a user to recognize, using touch and/or sight, a corresponding function that is activated by pressing each of the buttons. Recessed and/or raised symbols may allow a user to find and activate the flexible buttons by touch alone while undertaking activities such as walking, running, riding a bicycle or skateboard, or driving a vehicle. The tactile detection of the recessed and/or raised symbols may also be beneficial when the user has poor eyesight or is in an environment with reduced visibility.

Shell 110 also includes a release control 130 on side 112c that can unlatch cover 120 from shell 110 to expose the display of the wearable electronic device inside. Release control 130 is mechanically connected to a first latch element 132 (configured as an aperture) that interfaces with a second latch element 134 (configured as a latching protrusion) on cover 120, such that when release control 130 is actuated, the first latch element is disengaged from the second latch element, allowing cover 120 to be released from shell 110. A portion of cover 120 is attached to side 112a by a hinge element 128 (not visible, see FIG. 1D) that allows cover 120 to be folded open and closed while remaining attached to shell 110. In some embodiments, cover 120 may be coupled to other sides of shell 110, such as sides 112a-d, by hinge element 128. In some instances, hinge element 128 may include a pin that runs through a barrel in portions of cover 120 and shell 110, thereby semi-permanently attaching cover 120 to shell 110. In other embodiments, hinge element 128 may include one or more hooks or partial barrels on cover 120 that removably attach to a pivot on shell 110, allowing cover 120 to be easily removed from shell 110 while still allowing hinging action if desired. In some instances, hinge element 128 may be a living hinge. In other instances, shell 110 and cover 120 may not utilize a hinge element, and instead use a plurality of latching elements to secure cover 120 to shell 110. For example, multiple release controls and latch elements similar to release control 130 and latch elements 132 and 134 may be used to attach cover 120 to shell 110. In some embodiments, cover 120 may be attached to a band or strap by a hinge element, instead of being attached to shell 110. Certain embodiments of a shell 110 and cover 120 are configured such that cover 120 snaps onto shell 110 and is retained by one more releasable latch elements, such as a protrusion and groove.

Figure 1B:
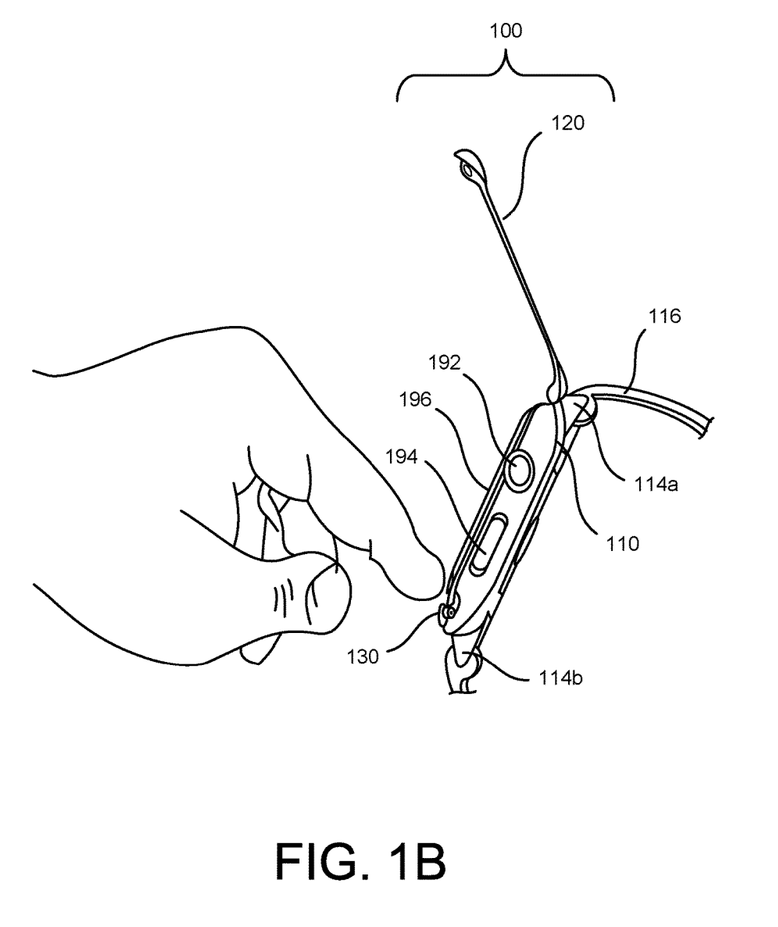
FIG. 1B illustrates a side view of a protective encasement embodiment including a shell and an attached cover that is opened to provide direct access to the display of the wearable electronic device.

FIG. 1B shows a side view of shell 110 and cover 120 in an opened position, exposing display 196 of the wearable electronic device. Opening of cover 120 to allow touch access to display 196 allows a user to view and access any additional functionality of the wearable electronic device that may be prevented when cover 120 is in a closed position. In certain embodiments, a spring element may be associated with cover 120 and shell 110, forcing cover 120 into an opened position in which the cover is in an angled position relative to a plane of the touch-sensitive display. To close cover 120 over shell 110, force may be applied to cover 120, overcoming the opening force of the spring element, until the second latch element of cover 120 engages the first latch element of shell 110, holding cover 120 in place. In some embodiments, release control 130 may be associated with a spring element, such that after force is applied to release control 130 to actuate it, release control 130 is forced back to its original position.

Figure 1C:
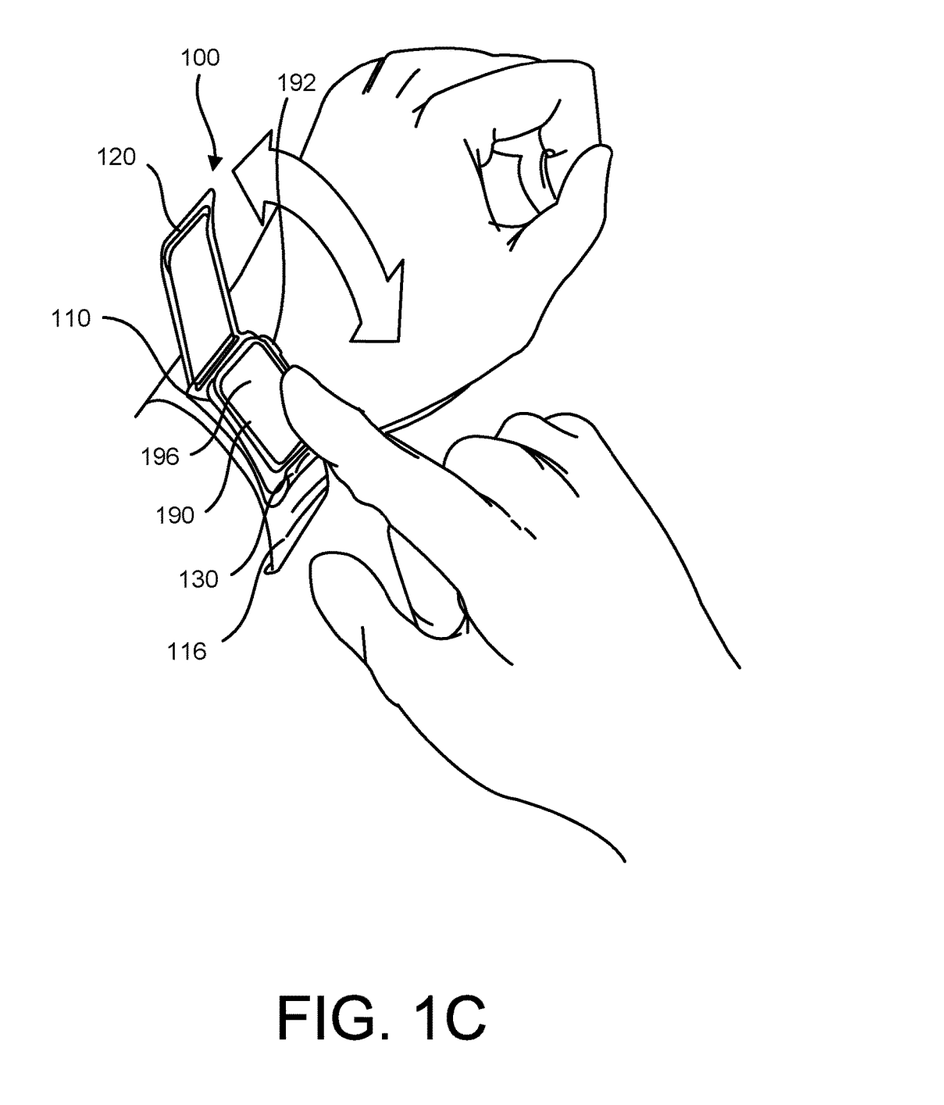
FIG. 1C shows a side view of a protective encasement embodiment that includes a shell and an attached cover, with the cover released into an opened position to allow direct access to the display of the wearable electronic device.

FIG. 1C shows a side view of a protective encasement embodiment 100 that includes shell 110 and attached cover 120, with cover 120 in an opened position allowing direct access to display 196 of the wearable electronic device 190. Display 196 is a touch-sensitive display that can detect contact on the surface of the display and where on the display that contact occurs. Display 196 of the wearable electronic device may be a capacitive touchscreen, a resistive touchscreen, a surface acoustic wave touchscreen, or an optical touchscreen, and may include pressure sensors to allow detection of differences in force applied by a user. Protective encasement 100 is attached to a user's wrist. The double-headed arrow indicates the movement of cover 120 when it is closed and opened over wearable electronic device 190.

In some embodiments, the wearable electronic device may include a software application that works in tandem with cover 120 to match the positions of buttons 126a-e with activatable regions on the wearable electronic device display. In such embodiments, the software application may be executed on a computer processor of the wearable electronic device. The software application includes non-transitory instructions that direct the computer processor to configure at least one region, or a plurality of regions of a touch-sensitive display of the wearable electronic, such as display 196, as a user-selectable input. When one of buttons 126a-e is pressed, it contacts the touch-sensitive display thereby activating the associated input. In response, the processor activates a function of the wearable electronic device. For example, functions activated and/or deactivated using buttons 126a-e may include those that control audio output and input (e.g. play, skip forward, fast forward, skip back, fast reverse, pause, record, volume up, and volume down). In some instances, the software application may be configurable by the user, permitting input locations on the wearable device display to be changed and/or customized to correspond with variations of cover 120 that have buttons in different areas. For example, display regions 198a, 198c, 198d, and 198e may be positioned proximate the corners of display 196 to match corresponding flexible buttons 126a, 126c, 126d, and 126e on the cover of the protective encasement. In some instances, different covers 120 may correspond to different applications or functions. For example, one cover may include buttons corresponding to audio playback while another cover may include other buttons corresponding to an alarm clock software or mode.

In some instances, the present technology may form a system that includes software application for configuring one or more regions of a touch-sensitive display as a user-selectable input, and may include a flexible cover for protecting the touch-sensitive display of the wearable electronic device as described herein. The software application may be packaged as a kit on a non-transitory storage medium along with the flexible cover, or may be available for download from a server over the Internet. In some embodiments, flexible covers for different models or brands of wearable electronic devices may be packaged with different software applications (or variable downloading instructions) that work with a given cover.

Figure 1D:
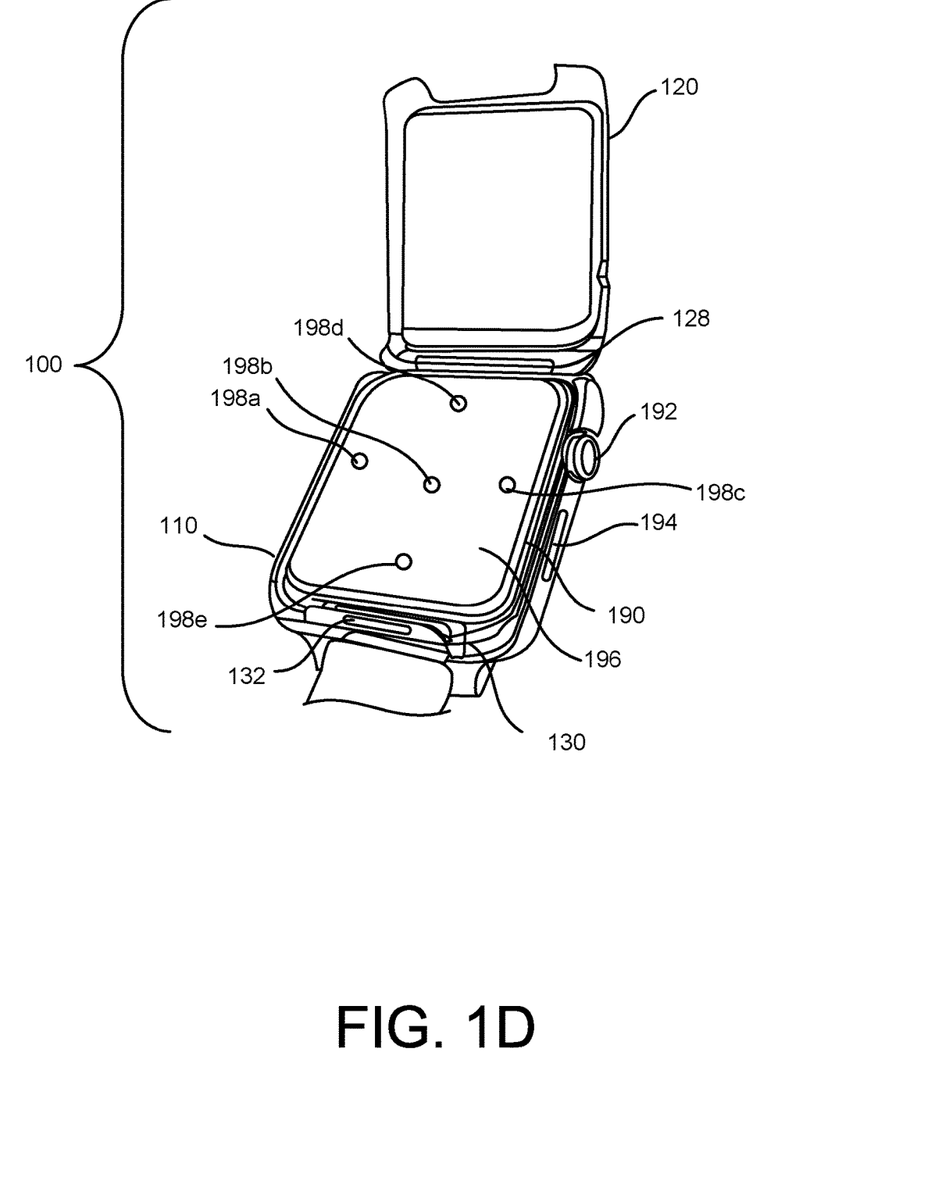
FIG. 1D shows a perspective view of a protective encasement embodiment with a shell and an attached cover for a wearable electronic device, with the cover opened and display regions emphasized on the display of the device.

FIG. 1D shows a perspective view of an embodiment of a protective encasement 100 with a shell 110 and an attached cover 120 for a wearable electronic device 190, with the cover opened and display regions 198a-e emphasized on the display of the device. The display regions 198a-e depicted in FIG. 1D are emphasized in FIG. 1D, but are not necessarily visible to a user. Display regions 198a-e correspond with buttons 198a-e on cover 120, such that when cover 120 is closed over display 196, flexible buttons 126a-e can be pressed to contact one of display regions 198a-e that is configured as an input. For example, display region 198a corresponds with button 126a, and when display region 198a is activated, a volume up (increased volume of sound output) is activated. In some embodiments, the software application may allow a user to select specific functions to be activated by touch input to a specific display region. Beneficially, buttons 126a-e can be used to activate the respective areas of the touch-sensitive display without opening cover 120 and without directly accessing the display. Beneficially, the display can be used while remaining protected by cover 120 and the user is able to easily find the desired function from among flexible buttons 126a-e due to the structure, configuration, and/or layout of flexible buttons 126a-e.

Using the techniques described herein, battery life of an encased wearable electronic device may be preserved. Although touch-sensitive functions of display 196 may be actively selectable by a user over a long period of time using the techniques disclosed herein, the functions need not be visible or backlit on display 196 because flexible buttons 126a-e provide the user guidance as to where pressing should occur to invoke a particular function. Avoiding further or extended activation of display 196 preserves the battery life of the wearable electronic device. In some cases, a touch input function of the device and the display function may be separate, such that only the touch input function need be activated and the display can be left temporarily off or inactive while operating as described herein.

Figure 1E:
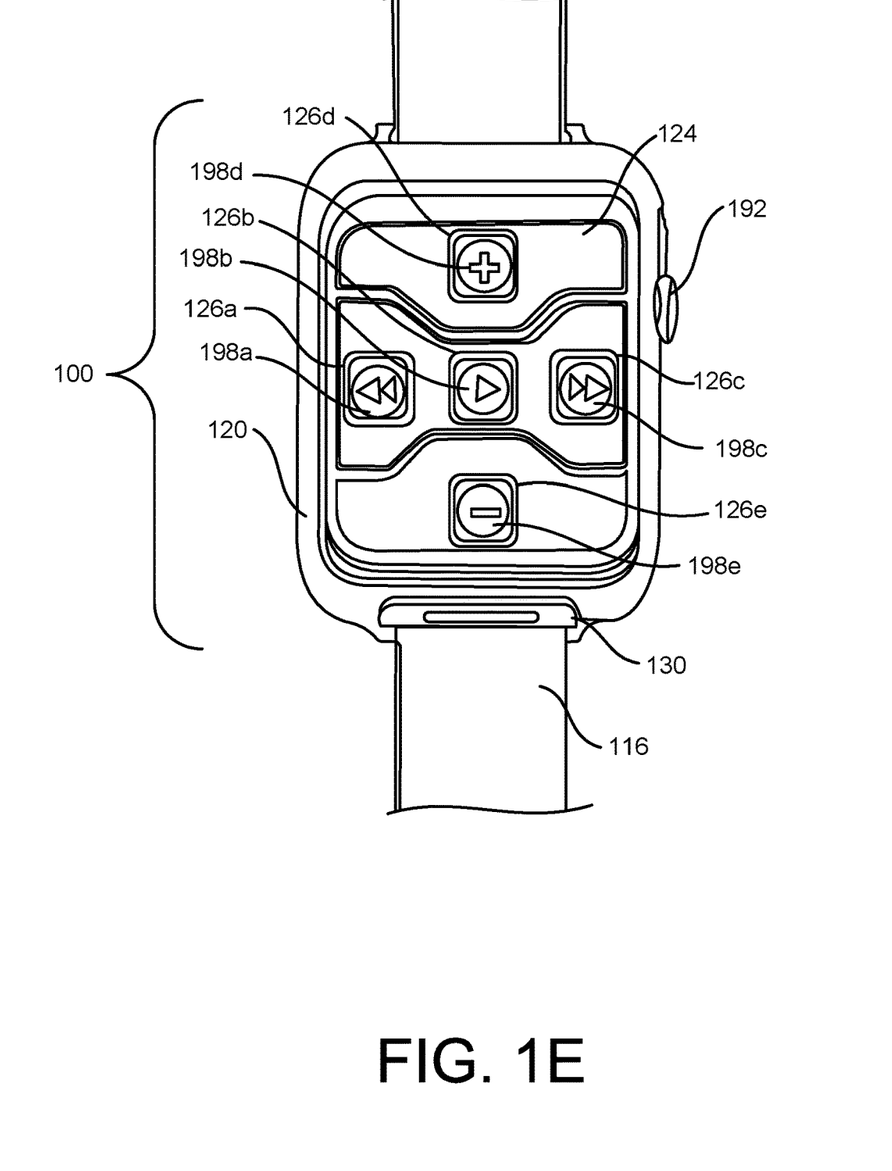
FIG. 1E illustrates a plan view of a protective encasement embodiment having a shell and attached semi-transparent cover for a wearable electronic device. Display elements of the device display are visible through the semi-transparent cover.

FIG. 1E shows a plan view of an embodiment of a protective encasement 100 that includes a shell 110 and an attached semi-transparent cover 120 for a wearable electronic device. In such embodiments, text and images presented on display 196 may be visible to a user while keeping cover 120 closed. Icons 199a-e presented on display 196 are visible through flexible buttons 126a-e. Icons 199a-e correspond with display regions 198a-e that can receive user input via touch and/or force applied through flexible buttons 126a-e. In some embodiments, button area 124 may be opaque, while one or more of flexible buttons 126a-e may be transparent or semi-transparent, allowing only portions of display 196 to be visible through flexible buttons 126a-e. Use of transparent or semi-transparent materials for flexible buttons and/or the button area 124 is beneficial for a user by allowing the display of the electronic device to indicate different symbols, and possibly different functions for a given region, without having to open the cover or physically change the cover.

For example, a user may configure a software application on the wearable electronic device to control audio player functions through the wearable electronic device. The display may display icons for the audio player controls (volume up/down, play, reverse, forward, etc.). Later, the user may configure the software application on the same device to control alarm or stopwatch functions on or through the wearable electronic device. Different icons or images may be displayed under the flexible buttons. In such instances, flexible buttons 126a-e may not include symbols embossed or recessed on their surface.

In certain embodiments, a low-power display may be integrated into a cover attached to a shell. The low-power display replaces the button area and flexible buttons in the cover. In such embodiments, the low-power display uses less power than the display of the wearable electronic device, while allowing for changes in the images shown on the low-power display. High contrast, color LED displays for wearable electronic devices can consume more power than anticipated if the display is used often over a long period of time. Adding a low-power display to the cover can decrease the overall power usage of the encased wearable electronic device, thus decreasing the need for charging or replacing the batteries.

A low-power display is a display that utilizes less power over time than the display of a wearable electronic device. Low-power displays may be constructed such that additional power is only required to change a pixel from one state to another. Exemplary low-power displays include electronic ink ("e-ink"; E-Ink Corp.) that utilize bi-stable, non-volatile materials to form an image, and memory LCD displays (Sharp Electronics) that use continuous grain silicon technology, requiring a low power draw to maintain an image and only require additional power to change portions of an image shown on the display.

Figure 2A:
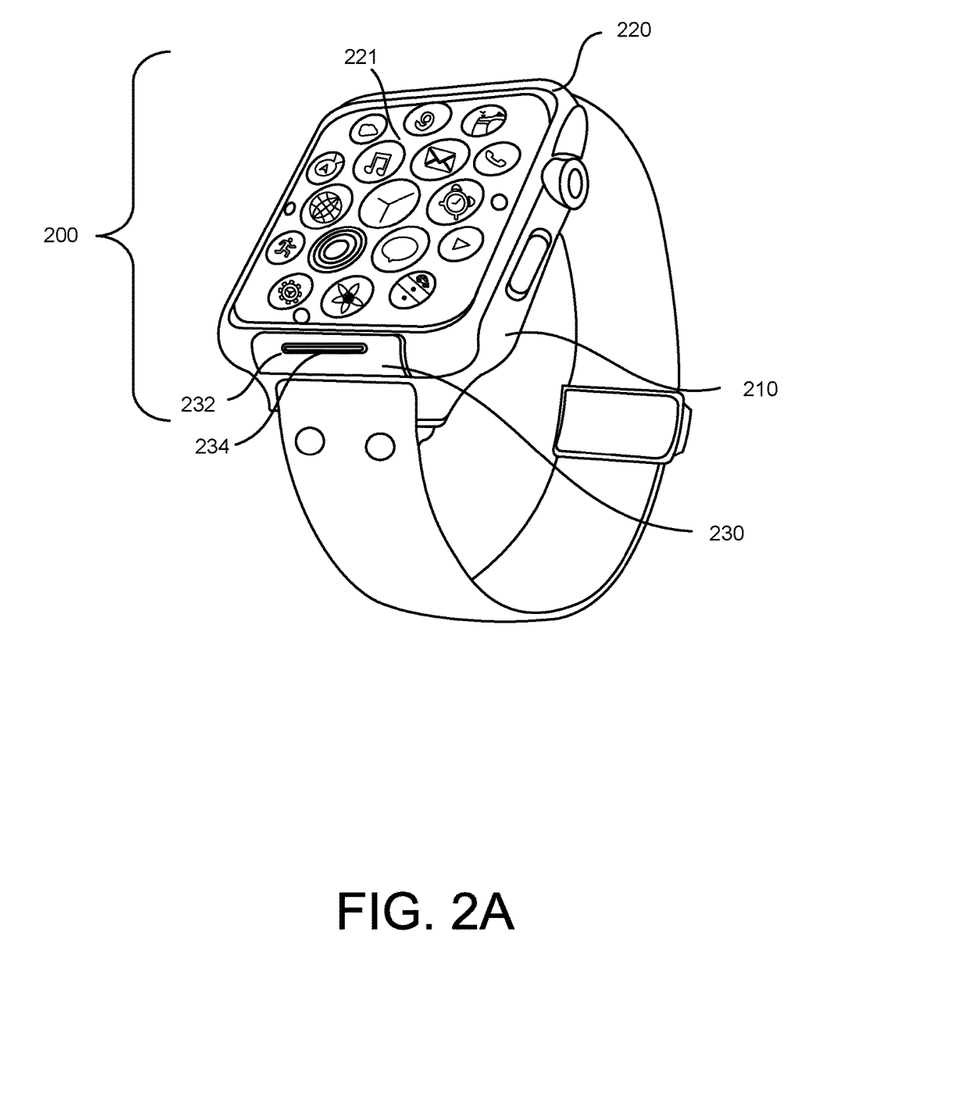
FIG. 2A illustrates a perspective view of a protective encasement embodiment that includes a shell and an attached cover that includes a low-power display in a closed position that overlays the display of the wearable electronic device.
Figure 2B:
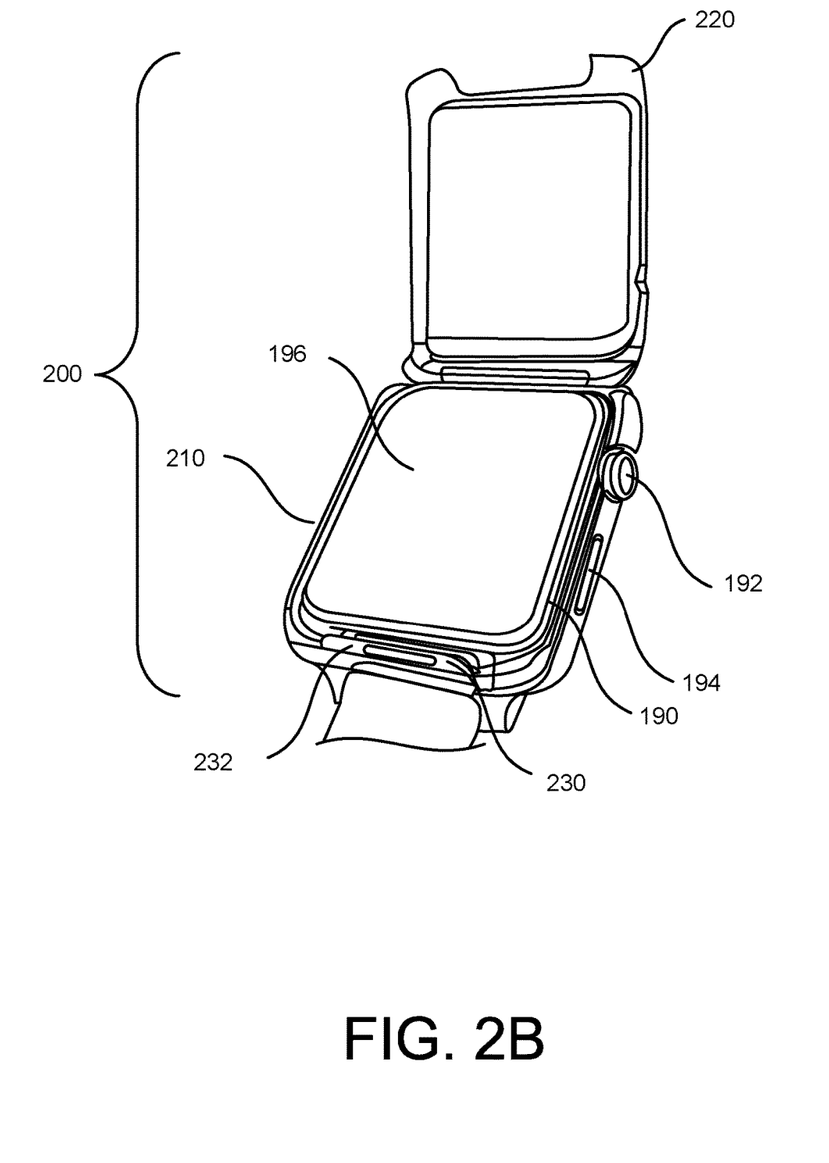
FIG. 2B shows a perspective view of a protective encasement embodiment that includes a shell and a low-power display in an opened position, allowing direct access to a wearable electronic device display.

An embodiment of a protective encasement 200 having a low-power display 221 is depicted in FIGS. 2A-2B. FIG. 2A illustrates a perspective view of protective encasement 200 including shell 210 and an attached cover 220 that includes a low-power display 221 in a closed position. Cover 220 and low-power display 221 are in a closed position that overlays display 196 (not visible, see FIG. 2B) of wearable electronic device 190. Release control 230 is connected to a first latch element 232 (configured as an aperture) that engages with a second latch element 232 (configured as a latching protrusion) on shell 210 to maintain low-power display 221 in closed position over display 196 of wearable electronic device 190. In the closed position, low-power display 221 is substantially similar to display 196. When low-power display 221 is in a closed position, it may change images only when instructed to by signals received from wearable electronic device 190. In certain instances, the low-power display may show a watch face with moving minute and/or second hands, changing numerals for a timer or stopwatch, or present a notification icon (e.g. new message received, an alarm, etc.). A low-power display integrated with a cover and/or a shell may be beneficial for a user, as the low-power display may be able to display information, e.g. text and/or images, constantly while using only a fraction of the power required to use the display of the wearable electronic device. While the wearable electronic device display may be desirable when directly interacting with the display or examining detailed information; however, a low power display can permit static or slowly-changing information to be presented to a user for a much longer length of time with a minimal impact on the battery life of the wearable electronic device, and without activating the display of the electronic device itself. A user can briefly glance at the information on the low-power display and allow the wearable electronic device to retain battery charge.

FIG. 2B shows a perspective view of an embodiment of a protective encasement 200 that includes a shell 210 and a cover 220 in an opened position (low-power display 221 not visible), allowing direct access to display 196 of wearable electronic device 190. When release control 230 is activated, first latch element 232 is disengaged from second latch element 234, allowing low-power display 230 to move to an opened position and allowing access to display 196 of the wearable electronic device 190. In some embodiments, a power source (e.g. a battery, a solar cell, or a kinetic energy capture device) is connected to the low-power display to supply power to the low-power display. The power source may be positioned on an inner surface of shell 210 or cover 220, or within shell 210 or cover 220. In some embodiments, the protective encasement may include an energy harvesting device to provide power to a battery, such as a solar or photovoltaic cell, a kinetic energy-harvesting device, or a heat energy-harvesting device. In other embodiments, the protective encasement may wirelessly capture electrical energy from the wearable electronic device, such as using one or more electrical coils that are used to inductively capture energy. Energy collected from such energy harvesting devices on the shell or proximate the low-energy display may be stored in a battery to provide power to the low-energy display.

Electrical circuitry may be included to receive signals from the wearable electronic device, process and relay those signals to the low-power display, and/or change the image displayed thereon. The signals may be electrical signals received by wires, or wireless signals, such as those used by BLUETOOTH® low energy or near field communication. In some instances, the electrical circuitry may be positioned on an inner surface of cover 220 or within cover 220. Some embodiments may have the electrical circuitry positioned on an inner surface of shell 210 or within shell 210.

In other embodiments, the protective encasement may include an electrical connector proximate an inner surface of the shell that encases the wearable electronic device. The electrical connector may convey wired electrical signals between the wearable electronic device and the low-power display. Electrical signals may include one or more of data and power. In such embodiments, the electrical connector connects at least one or more contacts of the wearable electronic device to one or more contacts of the wearable electronic device, allowing the electrical signals to be transferred between the low-power display and the wearable electronic device.

Figure 3:
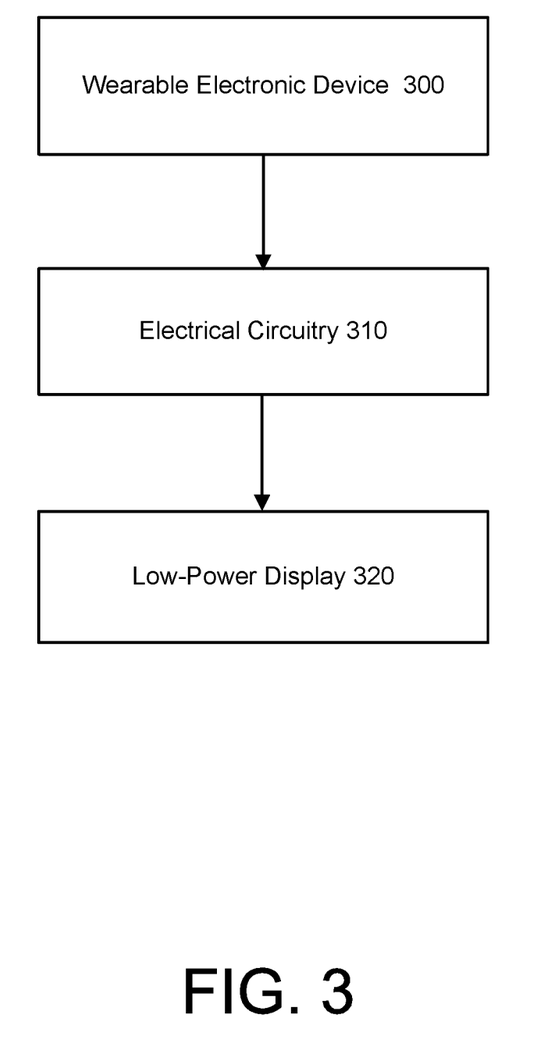
FIG. 3 shows a flow chart of signals conveyed between a wearable electronic device and a low-power display in a cover.

FIG. 3 shows a flowchart of signals conveyed between a wearable electronic device and a low-power display in a cover. A software application loaded on the wearable electronic device 300 instructs the device to send a signal to electrical circuitry 310 in the protective encasement in response to some action (the passage of time, detecting a change in environment, receiving a message, etc.). The wearable electronic device may be similar to wearable electronic device 190 in FIGS. 1A-1E and FIGS. 2A-2B. The low-power display may be installed in a cover, such as low-power display 221 (see, e.g., FIG. 2A), or may act as a cover itself. Electrical circuitry 310 may be positioned on an inner surface of or within covers described herein (e.g. FIGS. 2A-2B), or positioned on an inner surface of or within shells described herein (e.g. FIGS. 2A-2B). The electrical circuitry 310 receives the signal from the wearable electronic device 300, and then sends a signal to the low-power display 320 to change the image on the display accordingly. In order to minimize power usage by the wearable electronic device, the display of the wearable electronic device may not be active when the signal is sent to the electrical circuitry 310 of the protective encasement. In some embodiments, information displayed on the low-power display may differ from information that would usually be displayed on the wearable electronic device display. In certain instances, the images and/or information displayed on the low-power display may replicate images and/or information that is displayed on the wearable electronic device display.

In some instances of a protective encasement having a low-power display, the shell and/or the cover may include a sensor to detect whether the cover is in the opened or the closed position. For example, the sensor may detect when the cover is in the closed position and allow the electrical circuitry of the protective encasement to change images and/or characters on the low-power display. Conversely, the sensor may detect when the cover is in the opened position, and cause the electrical circuitry to cease changing images and/or characters on the low-power display in response to signals received from the wearable electronic device.

Some or all of the techniques disclosed herein may be implemented as a method using one or more of a software application, electrical circuitry, a shell, a cover, a low-power display, and/or flexible buttons.

The term "about" as used herein in reference to quantitative measurements, refers to the indicated value plus or minus 10%.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range are each inclusive of all of the intermediary units therein.

The foregoing description is intended to illustrate but not to limit the scope of the disclosure, which is defined by the scope of the appended claims. Other embodiments are within the scope of the following claims.

What is claimed:

1. A protective encasement for a wearable electronic device, the protective encasement comprising:
    a shell configured to encase at least a portion of the wearable electronic device,
    a cover hingedly attached to the shell, the cover having an open position and a closed position, the cover configured to overlay and protect a touch-sensitive display of the wearable electronic device when the cover is in the closed position and the wearable electronic device is encased in the shell, the cover configured to allow direct access to the touch-sensitive display of the wearable electronic device when the cover is in the open position and the wearable electronic device is encased in the shell, the cover comprising one or more flexible buttons, each of the one or more flexible buttons configured to be pressed by a user to activate a corresponding area of the touch-sensitive display of the wearable electronic device when the cover is in the closed position and the wearable electronic device is encased in the shell,
    a latch element attached to the shell, the latch element configured to removably retain the cover in the closed position, and
    a spring element attached to the shell, the spring element configured to move the cover from the closed position to the open position when the rigid cover is mechanically released from the latch element.

2. The protective encasement of claim 1, wherein the one or more flexible buttons comprise one or more symbols formed on a surface of the one or more flexible buttons.

3. The protective encasement of claim 2, wherein the one or more symbols on the surface of the one or more raised flexible buttons are raised such that a user of the protective encasement can tactically feel the one or more symbols and engage the one or more flexible buttons without looking at the protective encasement.

4. The protective encasement of claim 2, wherein the one or more symbols on the surface of the one or more raised flexible buttons are recessed such that a user of the protective encasement can tactically feel the one or more symbols and engage the one or more flexible buttons without looking at the protective encasement.

5. The protective encasement of claim 1, wherein the one or more flexible buttons are each configured to activate one or more specific functions of the wearable electronic device when the wearable electronic device is encased in the shell, the one or more specific functions associated with a software application of the wearable electronic device that correlates the pressing by the user of the one or more flexible buttons to the touch-sensitive display to activate the one or more specific functions of the encased wearable electronic device.

6. The protective encasement of claim 1, further comprising a strap, the strap attached to the shell and configured to allow the protective encasement to be attached to a body part.

7. The protective case of claim 1, wherein each of the one or more flexible buttons is configured to be pressed by a user to activate a corresponding area of the touch-sensitive display that detects a contact on the surface of the display and detects where on the display that contact occurs when the cover is in the closed position and the wearable electronic device is encased in the shell.

8. The protective case of claim 1, wherein each of the one or more flexible buttons is configured to be pressed by a user to activate a corresponding area of a touch-sensitive display that includes pressure sensors to allow detection of differences in force applied by a user when the cover is in the closed position and the wearable electronic device is encased in the shell.

9. The protective case of claim 1, wherein each of the one or more flexible buttons is configured to be pressed by a user to activate a corresponding area of the touch-sensitive display that is a capacitive touchscreen, a resistive touchscreen, a surface acoustic wave touchscreen, or an optical touchscreen of the wearable electronic device when the cover is in the closed position and when the wearable electronic device is encased in the shell.

10. The protective case of claim 1, wherein the shell comprises one or more sides and at least one aperture on the one or more sides of the shell, the at least one aperture configured to allow access to a knob of the wearable electronic device when the wearable electronic device is encased in the shell.

11. A protective case system for a wearable electronic device, the wearable electronic device having a touch-sensitive display, the protective case comprising:
    a shell configured to encase at least a portion of the wearable electronic device;
    a rigid cover attached to the shell, the rigid cover having a perimeter portion configured to surround the touch-sensitive display of the wearable electronic device when the wearable electronic device is encased in the shell, wherein the rigid cover is hingedly attached to the shell;
    a flexible button area attached to the rigid cover, the flexible button area defined by the perimeter portion of the rigid cover, the flexible button area configured to be shaped to the touch-sensitive display of the wearable electronic device when the wearable electronic device is encased in the shell, the flexible button area having one or more buttons configured to correspond to one or more regions on the touch-sensitive display of the wearable electronic device when the wearable electronic device is encased in the shell, wherein the rigid cover has a first position configured such that the flexible button area covers the touch-sensitive display of the wearable electronic device when the wearable electronic device is encased in the shell, and wherein the rigid cover has a second position configured such that the flexible button area exposes the touch-sensitive display of the wearable electronic device when the wearable electronic device is encased in the shell, wherein the rigid cover is secured to the shell in the first position using a latch mechanism; and a spring element attached to the shell, the spring element configured to move the rigid cover from the first position to the second position when the rigid cover is mechanically released from the latch mechanism.

12. The protective case system of claim 11, the one or more buttons of the flexible button area each having one or more raised symbols, each of the one or more raised symbols corresponding to specific functions of the touch-sensitive display of the encased wearable electronic device.

13. The protective case system of claim 12, each of the one or more raised symbols being music playback symbols.

14. The protective case system of claim 11, wherein the flexible button area is at least semi-transparent such that the touch-sensitive display of the encased wearable electronic device is at least partially visible through flexible button area.

15. The protective case system of claim 11, further comprising the wearable electronic device and a software application executable on a computer processor of the wearable electronic device, the software application comprising non-transitory instructions that direct the computer processor to configure at least one of the one or more regions on the touch-sensitive display as user-selectable inputs, each user-selectable input for activating an associated function of the software application such that a force exerted on one of the one or more buttons of the flexible button area transmits the force to the respective one or more regions of the touch-sensitive display to activate the corresponding user-selectable input and to activate the associated function of the software application.

16. A protective case for a wearable electronic device, the wearable electronic device having a touch-sensitive display, the protective encasement comprising:

a shell configured to at least partially encase the wearable electronic device, the shell comprising one or more sides that correspond to one or more sides of the wearable electronic device when the wearable electronic device is encased in the shell and at least one aperture on the one or more sides of the shell, the at least one aperture configured to allow access to a knob of the wearable electronic device when the wearable electronic device is encased in the shell; and a display cover removably attached to the shell, the display cover comprising one or more flexible buttons configured to interact with one or more locations of the touch-sensitive display of the wearable electronic device when the wearable electronic device is encased in the shell.

17. The protective case of claim 16, further comprising a flexible material on an interior surface of the shell, to at least partially surround and cushion the wearable electronic device when the wearable electronic device is encased in the shell.

18. The protective case of claim 16, further comprising a strap integrally formed on the shell, the strap configured to attach the protective encasement to a user's wrist.

\* \* \* \* \*